2 Sheets--Sheet 1.

J. L. MORRISON & T. H. FLETCHER.
Scythe Stone Holders.

No. 137,560.  Patented April 8, 1873.

Witnesses:
Frank H. Jordan.
Edwin W. Haskell

Inventors:
J. L. Morrison
Tristram H. Fletcher
By their Atty.
Wm. Henry Clifford.

2 Sheets--Sheet 2.

J. L. MORRISON & T. H. FLETCHER.
Scythe Stone Holders.

No. 137,560. Patented April 8, 1873.

Witnesses:
Frank H. Jordan
Arthur Noble

Inventor:
Jessie L. Morrison.
Tristram H. Fletcher.
By their atty.
Wm. Henry Clifford.

UNITED STATES PATENT OFFICE.

JESSIE L. MORRISON AND TRISTRAM H. FLETCHER, OF NORTH HOLLIS, ME.

IMPROVEMENT IN SCYTHE-STONE HOLDERS.

Specification forming part of Letters Patent No. 137,560, dated April 8, 1873; application filed February 10, 1873.

*To all whom it may concern:*

Be it known that we, JESSIE L. MORRISON and TRISTRAM H. FLETCHER, of North Hollis, in the county of York and State of Maine, have invented certain new and useful Improvements in Attachments to Scythe-Stones; and we do hereby declare that the following is a full, clear, and exact description thereof, that will enable others skilled in the art to which it appertains to make and use the same, reference being had to the accompanying drawing and to the letters of reference marked thereon which form a part of this specification.

Figure 1:
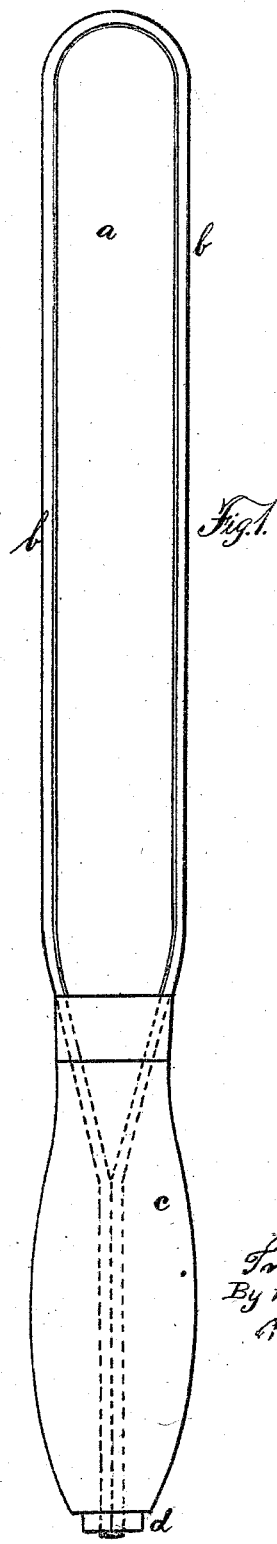
Figure 2:
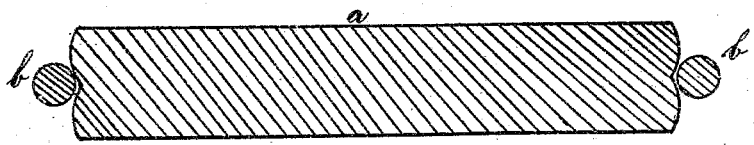

Figure 1 is a side elevation of our invention holding a rifle-stone in place. Fig. 2 is a cross-section taken on an enlarged scale from that of Fig. 1.

The object of our invention is to produce a means by which a common rifle-stone, used for sharpening or "whetting" scythe or like-edged tools may be held in a position more convenient to use than it otherwise would be. It also adds to the strength of the stone and to the durability of the same.

In the drawing, $a$ represents the stone; $b$, the frame in which it is inclosed; $c$, the handle; and $d$, the nut for holding or securing the ends of the frame or rod $b$, which passes down through the handle in manner as shown by dotted lines.

The rod or frame $b$ passes around the edges of the stone, (see the drawing,) at one end of which the two ends of the rod are brought together and pass down through the handle, and are there secured by means of the nut $d$.

It will be remarked, of course, that on the ends of the rod or frame $b$ a male thread may be cut that will fit the nut $d$, so that by turning the nut $d$ in one direction the rod or frame $b$ is tightened around the stone, while turning in the opposite it becomes loosened. This is quite an important feature—as, for instance, a stone gets broken from some cause or other, the nut $d$, operating as described, allows the frame to be loosened and another stone to be inserted. It will also be seen that the whole length of the stone may be used for grinding purposes when our invention is employed, which is not the case if our invention is not used, as some part of the stone has to be held in the hand.

Around the edges of the stone grooves may be cut in which the frame may fit, and thus hold the stone in a firm and secure position.

What we claim as our invention, and desire to secure by Letters Patent, is—

The combination of the frame $b$, the handle $c$, and nut $d$, arranged to hold the stone $a$, as shown and described, and to operate as herein set forth.

In testimony that we claim the foregoing we have hereunto set our hands this 1st day of February, 1873.

J. L. MORRISON.
TRISTRAM H. FLETCHER.

Witnesses:
EDGAR S. BROWN,
FRANK H. JORDAN.